US005656899A

United States Patent [19]

Kuroda

[11] Patent Number: 5,656,899

[45] Date of Patent: Aug. 12, 1997

[54] CONTROL APPARATUS FOR DOOR LOCK DEVICE

[75] Inventor: Katsuya Kuroda, Nirasaki, Japan

[73] Assignee: Mitsui Mining & Smelting Co., Ltd., Tokyo, Japan

[21] Appl. No.: 496,746

[22] Filed: Jun. 29, 1995

[30] Foreign Application Priority Data

| | | | |
|---|---|---|---|
| Jul. 18, 1994 | [JP] | Japan | 6-186856 |
| Jul. 19, 1994 | [JP] | Japan | 6-187858 |

[51] Int. Cl.[6] .......... H02P 1/00

[52] U.S. Cl. .......... 318/283; 318/254; 318/138; 318/439; 70/275; 292/201

[58] Field of Search .......... 292/DIG. 7, 4, 292/46, 201, 23; 318/254, 138, 439, 466, 468, 445, 450, 453, 283; 70/275, 277, DIG. 80

[56] References Cited

U.S. PATENT DOCUMENTS

| | | | |
|---|---|---|---|
| 5,037,145 | 8/1991 | Wilkes | 292/46 X |
| 5,236,234 | 8/1993 | Norman | 292/46 X |
| 5,409,277 | 4/1995 | Rogers, Jr. et al. | 292/DIG. 7 X |
| 5,438,855 | 8/1995 | Ikeda | 292/DIG. 7 X |
| 5,441,317 | 8/1995 | Gruden et al. | 292/46 X |

*Primary Examiner*—Karen Masih
*Attorney, Agent, or Firm*—Morrison Law Firm

[57] ABSTRACT

A control apparatus for a door lock device having a superlock mechanism comprising a state detecting member, a brush fixed thereto, first to third terminals opposing the brush, and a power supply circuit for supplying power to a motor which drives the lock device, the state detecting member moving among three positions corresponding to unlocked, locked, and superlocked states, the circuit supplying the power via the terminals and the brush on performing the shift from the unlocked or superlocked state to the locked state, and the terminals and the brush stopping the power supply to complete the shift, and the stop of the power supply being detected on the basis of the current flow through the motor.

10 Claims, 12 Drawing Sheets

CONTROL APPARATUS FOR DOOR LOCK DEVICE

BACKGROUND OF THE INVENTION

1. Field of the Invention

The present invention relates to an apparatus for controlling the drive of a door lock device having a superlock mechanism which is effective for preventing robbery of, e.g., an automobile.

2. Prior Art

Conventionally, a door lock device is provided with a lock lever which is switched between a lock position where the door cannot be opened and an unlock position where the door can be opened when the door-opening handles on the inner and outer sides of the door are operated. A lock device is known which is provided with a superlock mechanism for preventing the lock lever from being switched from the lock position to the unlock position even when an inner lock button is operated to unlock.

There is known a door lock device having such a superlock mechanism from, for example, Japanese Patent Laid-Open Gazette No. 5-59858. In this device, a rotating body is rotated clockwise and counterclockwise by a motor, and the projecting portion of the rotating body is engaged with an interlocking groove formed in a lock lever, thereby moving the lock lever between a lock position and an unlock position. Also, the projecting portion of the rotating body is located in a predetermined superlock position, and movement of the lock lever located at the lock position is restrained to achieve superlocking. In the apparatus for controlling this door lock device, when a shift between unlock and locked states is performed, power is initially supplied to the motor through a brush and a terminal used for starting. The power is then supplied to a brush and a terminal used for detecting the neutral position of the rotating body. When the rotating body reaches the neutral position, the terminal and the brush for said detection are disconnected from each other, thereby stopping power supply to the motor. To perform a shift from the locked state to a superlocked state, power is supplied through a brush and a terminal used for detecting the restraint position. Then, the terminal and brush are disconnected from each other, thereby stopping power supply to the motor.

As a means for controlling driving of the motor of a door lock device similarly having a superlock mechanism, there is known, for example, one having a microswitch which is switched from a contact A to a contact B when the lock device comes into the locked state. To perform a shift from the unlocked state to the locked state, power is supplied to the motor through the contact A. To perform a shift from the locked state to the superlocked state, power is supplied to the motor through the contact B.

However, in the conventional door lock device described above, when the superlocked state is disengaged, the locked state is also undesirably released simultaneously, and a function which performs a shift from the superlocked state to the locked state is not provided. Therefore, the present inventors have previously proposed a door lock device (Japanese Patent Application Nos. 5-326300 and 6-47684) in which only the superlocked state can be disengaged while the lock lever is held at the lock position.

The superlock mechanism of this proposed device has an arrangement in which a superlock member that switches between the superlock position and the disengaging position is displaced by a motor. When the superlock member is located at the superlock position, the inner lock button and the lock lever are disconnected from each other, so that the lock lever cannot be switched by the inner lock button.

The motor switches not only the superlock member between the superlocked state and the disengaged state but also the lock lever between the lock position and the unlock position. More specifically, when the motor is rotated clockwise, the lock lever is switched to the lock position first, and thereafter the superlock member is switched to the superlock position. In other words, the unlocked state, locked state, and superlocked state are desirably selected by controlling the rotating time or rotating amount of the motor.

However, since said proposed door lock device is rather different from the conventional door lock device described above, it is difficult to employ, as its control means, one obtained through a minor change of the conventional control means.

SUMMARY OF THE INVENTION

It is, therefore, an object of the present invention to provide an apparatus suitable for controlling a door lock device having a function of achieving a shift from the superlocked state to the locked state.

In order to achieve the above object, according to an aspect of the present invention, there is provided a control apparatus for a door lock unit that shifts between unlocked, locked, and superlocked states in accordance with the amount and direction of a motor (35) driven, the control apparatus comprising control means for performing a shift among the three states by controlling power supply to the motor based on given instructions. The control means comprises a state detecting member the position of which shifts in accordance with said states, a brush (94) fixed to the state detecting member (121), first, second and third terminals (91, 92 and 93) provided in opposition to the brush, the first and second terminals being brought into sliding contact with the brush when performing a shift from the unlocked state to the locked state, and the first and third terminals being brought into sliding contact with the brush when performing a shift from the superlocked state to the locked state, and a power supply circuit (97, 103) for supplying power to the motor through the first and second terminals and the brush when performing the shift from the unlocked state to the locked state, and through the first and third terminals and the brush when performing the shift from the superlocked state to the locked state, and for directly supplying power to the motor, not through the first to third terminals and the brush, when performing other state shifts, wherein power supply to the motor is stopped when finishing a shift from the unlock or superlocked state to the locked state, by a disconnection of the brush from the terminals. The reference numerals within the brackets in this specification are identical with those of corresponding elements in FIGS. 1 to 3. This applies to the following description.

The power supply circuit comprises, for example, first and second paths that are interposed in a path for supplying power to the motor and are parallel to each other. The brush and the first to third terminals are interposed in the first path. The power supply circuit comprises switching means (98–101) for determining whether power supply to the motor is performed through the first or second path, or is turned off. The aforesaid door lock device has, for example, an output member (38) swung by the motor from a neutral position in two directions. In a shift between the respective states, the output member is swung by the motor toward a first swing position for causing a shift to the locked state, toward a second swing position, having a swing angle larger than that of the first swing position, for causing a shift to the superlocked state, and then toward third and fourth swing positions, positioned almost symmetrically with respect to the first and second swing positions about said neutral position, for releasing the superlocked and locked states, respectively. The output member is returned to the neutral position after a shift to each state. The output member has a groove extending along a swing direction thereof and having a length almost corresponding to a length between the neutral position and the second swing position. The state detecting member has an engaging member engageable with the groove and swingable in the same direction as the output member. Thus, the state detecting member is moved by the output member when the output member is moved to any one of the first to fourth swing positions, and takes a position in accordance with a corresponding one of the unlocked, locked, and superlocked states. The control means has means (83–86) for detecting, when the door lock device shifts to the superlocked or unlocked state, that the door lock device has reached the superlocked or unlocked state, and outputting a signal indicating this, thereby to stopping power supply to the motor based on the detection signal.

In this arrangement, upon reception of a shift signal instructing a shift to the locked state in the superlock or unlocked state, the power supply circuit (97, 103) controls power supply to the motor (35) to perform a shift to the locked state. More specifically, the power supply circuit supplies power to the motor through the first and second terminals (91, 93) and the brush (94) when performing the shift from the unlocked state to the locked state, and through the first and third terminals (91, 92) and the brush (94) when performing the shift from the superlocked state to the locked state. As a result, the motor is rotated, and the brush is moved on the terminals. When the locked state is achieved, the brush and the terminals are disconnected from each other, and power supply to the motor is stopped. To perform other state shifts, the power supply circuit supplies power to the motor not through the first to third terminals or the brush. Thus, a control operation suitable for a door lock device also having a function of performing the shift from the superlocked state to the locked state is performed.

According to another aspect of the present invention, there is provided a drive control apparatus of a door lock device that shifts between unlocked, locked, and superlocked states in accordance with the amount and direction of a motor (35) driven, comprising: control means (97, 103) for performing a shift between the unlocked, locked, and superlocked states by controlling power supply to the motor based on a given instruction; power supply stopping means (91–94), having a brush (94) and a terminal (91–93) which are moved relative to each other by the motor while being in slidable contact with each other, for stopping power supply to the motor, at a moving position after being shifted from the unlocked or superlocked state to the locked state, by disconnecting the brush from the terminal; and detection means (102) for detecting that power supply to the motor is stopped based on a current flowing through the motor, and outputting a stop detection signal indicating this to the control means.

More specifically, this apparatus further comprises first and second paths that are interposed in a path for supplying power to the motor and are parallel to each other. The power supply stopping means (91–94) is interposed in the first path. The control means (97, 103) comprises switching means (99–101) for determining whether power supply to the motor is performed through the first or second path, or is turned off. The terminal includes first to third terminals (91–93), the brush (94) is brought into slidable contact with the first and second terminals (91, 93) when performing the shift from the unlocked state to the locked state, and with the first and third terminals (91, 92) when performing the shift from the superlocked state to the locked state. The control means comprises switching means (98) for determining whether power supply to the motor is performed through the second or third terminal (93, 92). The control means supplies power to the motor, in the unlocked or superlocked state, through the first path upon reception of a signal instructing a shift to the locked state, and performs a control operation thereafter, upon reception of a signal instructing a shift to another state, when the detection means (102) outputs a stop detection signal. As the detection means, one which outputs a stop detection signal when a predetermined number of times of pulsation of a current accompanying rotation of the motor are not detected within a predetermined period of time, one which outputs a stop detection signal when a current flowing through the motor becomes a predetermined value or less, or the like can be used.

In this arrangement, upon reception of a shift signal instructing the shift to the locked state in the superlocked or unlocked state, the control means (97, 103) controls power supply to the motor (35) to perform the shift to the locked state. As a result, the motor is rotated, and the brush is moved on the terminals. When the locked state is achieved, the brush and the terminals are disconnected from each other, power supply to the motor is stopped, and a stop detection signal is output to the control means. Upon reception of this signal, the control means is immediately set in a power supply stop state, and waits for a next signal to be supplied, or is set in a power supplying state in accordance with a signal supplied previously. Therefore, a shift to a next state is possible immediately after reaching the locked state, or is started.

DESCRIPTION OF THE PREFERRED EMBODIMENTS

The arrangement and operation of the present invention will be described in more detail with reference to preferred embodiments thereof.

Figure 5:
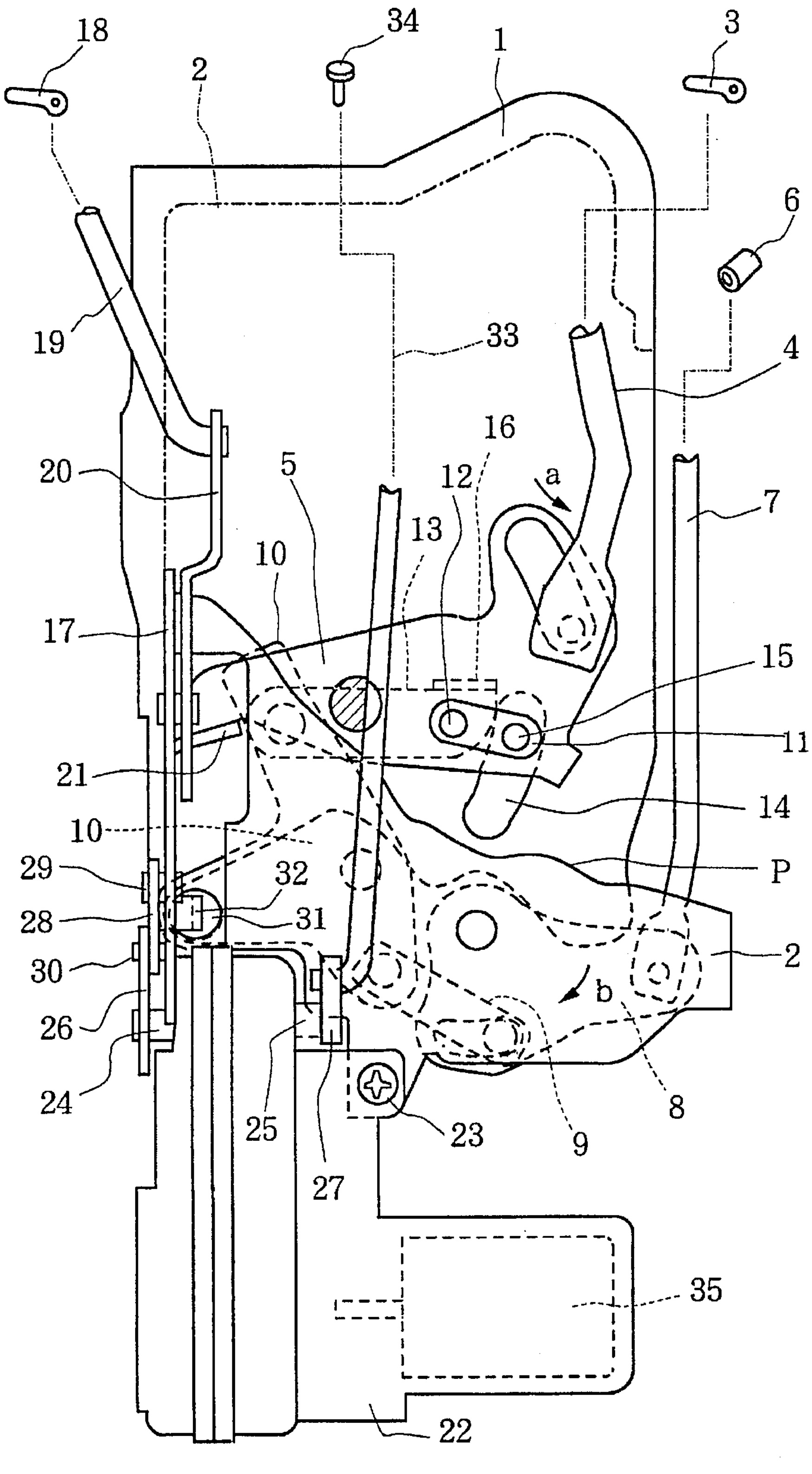
FIG. 5 shows the entire structure of a door lock device to which the apparatus shown in FIGS. 1 or 3 is applied.

FIG. 5 is a rear view of a door lock device according to an embodiment of the present invention. Referring to FIG. 5, reference numeral 1 denotes a lock body made of a synthetic resin or the like. A back plate 2 is attached to the rear surface of the lock body 1. A line P is a line along which the back plate 2 is cut out. The portion of the back plate 2 above the line P is indicated by a chain line, and the portion thereof below the line P is indicated by a solid line. A predetermined gap is provided between the lock body 1 and the back plate 2. An open lever 5, an intermediate lever 8, a lock lever 10, a movable column 13, and the like are provided in this gap. The open lever 5 is coupled to an outer door-opening handle 3 of the door through a rod 4. The intermediate lever 8 is connected to a key cylinder 8 of the door through a rod 7. The lock lever 10 is coupled to the intermediate lever 8 through a link 9. One end of the movable column 13 has a pin 12 to engage with an elongated hole 11 formed in the open lever 5, and the other end thereof is coupled to the lock lever 10.

Although not shown, a latch and a ratchet are provided on the front surface of the lock body 1. The latch is engaged with the striker of the automobile body and rotated. The ratchet is engaged with the engaging stepped portion on the outer circumference of the latch, and prevents reverse rotation of the latch. A ratchet pin 15 is integrally provided to the ratchet to project to the rear surface side of the lock body 1 through a through hole 14 formed in the lock body 1. When the ratchet pin 15 is moved downward in FIG. 5, the ratchet is separated from the latch, thereby opening the door.

Reference numeral 16 denotes an engaging segment formed on the movable column 13. The respective levers in FIG. 5 are in the locked state. In this state, even when the open lever 5 is rotated in the direction indicated by an arrow a by the outer door-opening handle 3, thus rotating the movable column 13 clockwise through engagement of the elongated hole 11 with the pin 12, the engaging segment 16 of the movable column 13 is not brought into contact with the ratchet pin 15 but idles. Hence, the ratchet is not rotated, and thus the door cannot be opened. When, however, the key cylinder 6 is rotated to rotate the rod 7 and the intermediate lever 8 in the direction indicated by an arrow b, thereby rotating the lock lever 10 clockwise, the movable column 13 is moved to the right to perform a switching operation to the unlocked state, and the engaging segment 16 of the movable column 13 is shifted to a position opposing the ratchet pin 15. In this state, when the open lever 5 is rotated in the direction indicated by the arrow a by operating the outer door-opening handle 3, the movable column 13 is rotated clockwise through engagement of the elongated hole 11 with the pin 12, and the engaging segment 16 is engaged with the ratchet pin 15 to move it downward. Hence, the ratchet is separated from the latch, thereby opening the door.

Reference numeral 17 denotes a bracket portion formed by bending the end portion of the back plate 2 backward. An inner lever 20, coupled to an inner door-opening handle 18 of the door through a rod 19, is axially supported on the bracket portion 17. The end portion of the inner lever 20 opposes an engaging portion 21 formed on the end portion of the open lever 5. When the inner lever 20 is rotated and is engaged with the engaging portion 21, the open lever 5 is rotated clockwise.

Figure 16:
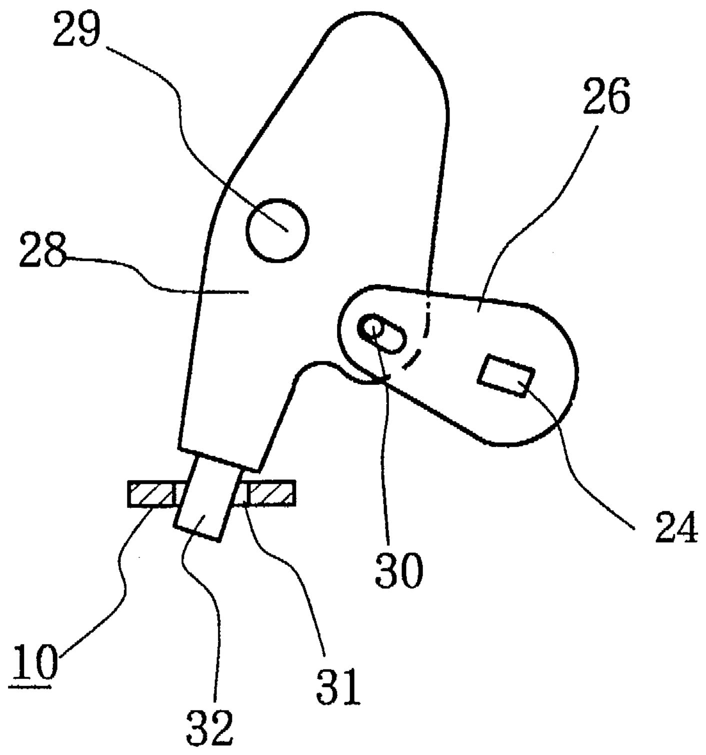
FIG. 16 is a view showing the coupled state from the lock lever to the key output shaft of the device shown in FIG. 5.

An actuator portion 22 is fixed to the lower portion of the back plate 2 through a screw 23. The actuator portion 22 is provided with a left-side key output shaft 24 and a right-side sill knob output shaft 25. A lever 26 is fixed to the key output shaft 24, and a lever 27 is fixed to the sill knob output shaft 25. Reference numeral 28 denotes a crank lever axially supported on the bracket portion 17 through a shaft 29. One end of the crank lever 28 is coupled to the lever 26 through a pin 30 (see FIG. 16), and the other end 31 thereof is engaged with a locking hole 32 formed in the end portion of the lock lever 10. Thus, the lock lever 10 and the key output shaft 24 are coupled to and interlocked with each other. When the key output shaft 24 is rotated, the lock lever 10 is rotated to perform a switching operation between the locked and unlocked states. The lever 27 is coupled to an inner lock button 34 of the door through a rod 33.

Figure 6:
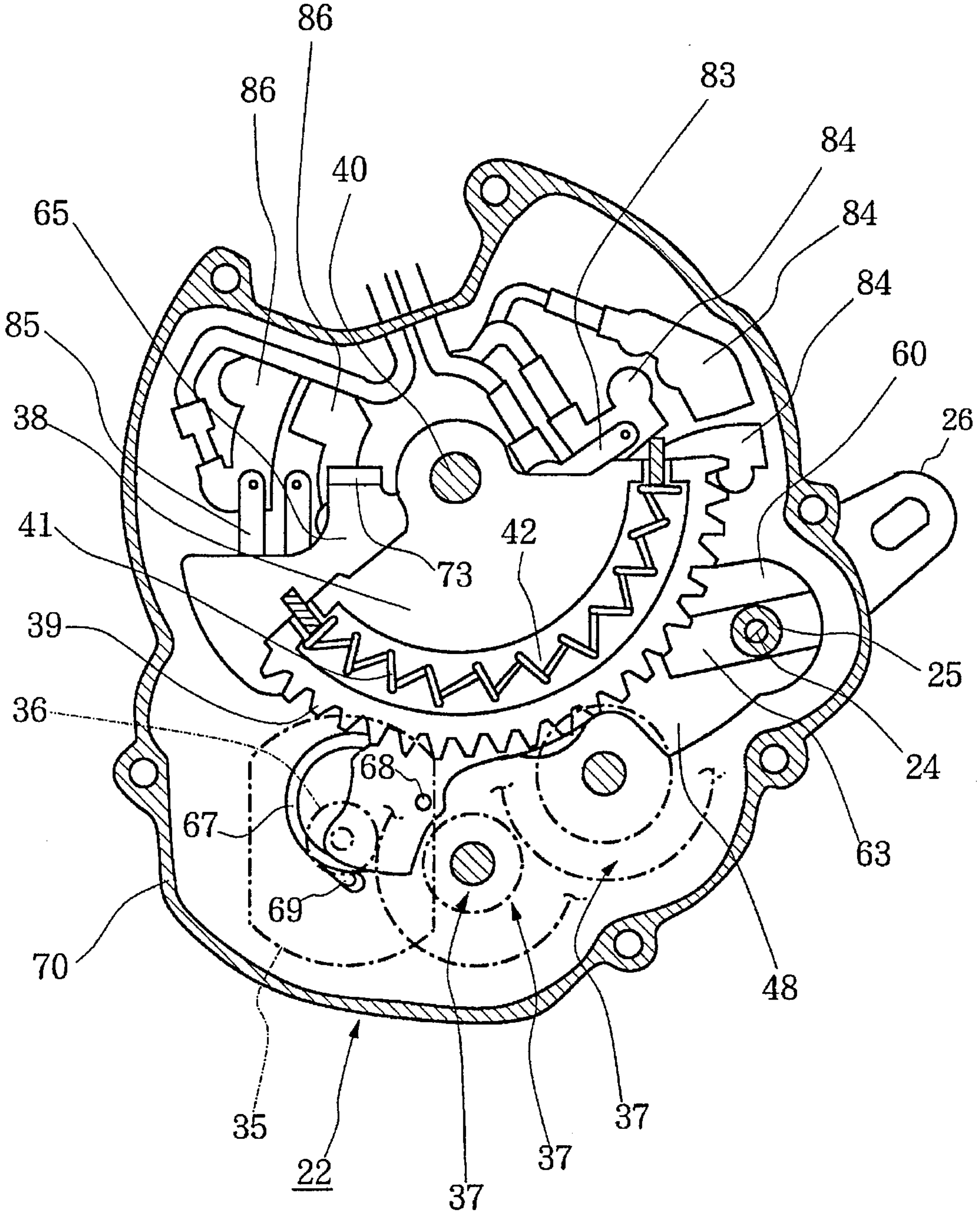
FIG. 6 is a sectional view of the actuator portion of the device shown in FIG. 5.
Figure 8:
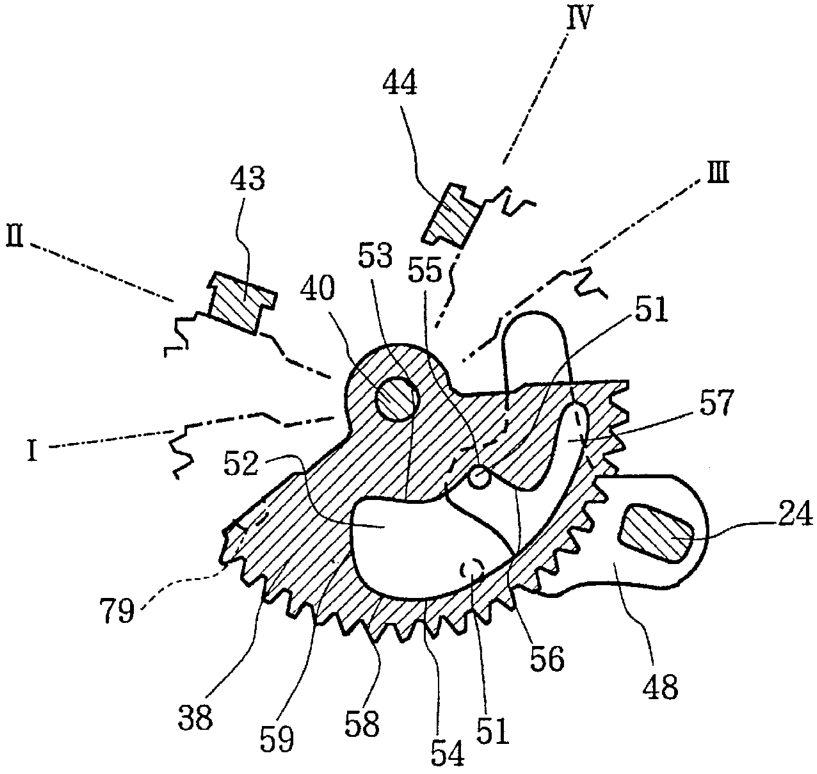
FIG. 8 is an explanatory view showing the relationship between the cam groove and the projection of the device shown in FIG. 5.

FIG. 6 shows the internal structure of the actuator portion 22. A gear portion 39 of a fan-shaped rotating output member 38 meshes with a driving gear 36 of a motor 35 through a plurality of reduction gears 37. The output member 38 is rotatably supported by a shaft 40. Reference numeral 41 denotes a spring housed in an arcuated groove 42 of the output member 38. The output member 38 is normally held at the neutral position shown in FIG. 6 (identical to the position of the solid line in FIG. 8) by the elastic force of the spring 41. When the motor 35 is rotated in the forward direction, the output member 38 is rotated clockwise from the neutral position about the shaft 40 as the center, to reach a superlock point II, where it is brought into contact with a stopper 43, through a lock point I, as shown in FIG. 8. Inversely, when the motor 35 is rotated in the reverse direction, the output member 38 is rotated counterclockwise from the neutral position shown in FIG. 8, to reach an unlock point IV, where it is brought into contact with a stopper 44, through a superlock disengaging point III.

Figure 7:
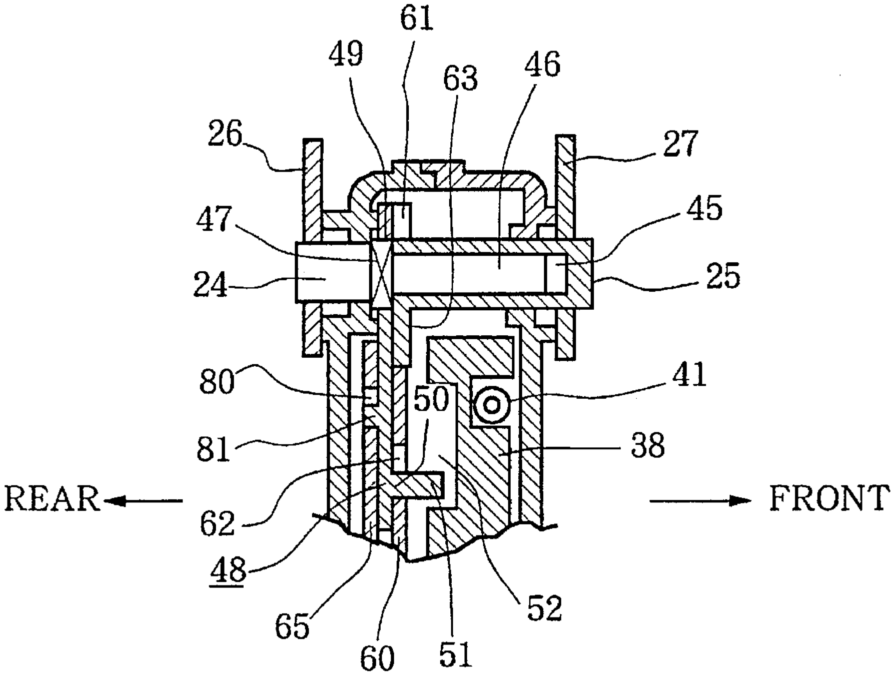
FIG. 7 is a view showing an assembly representing the relationship of the output shaft of the actuator portion of the device shown in FIG. 5.
Figure 9:
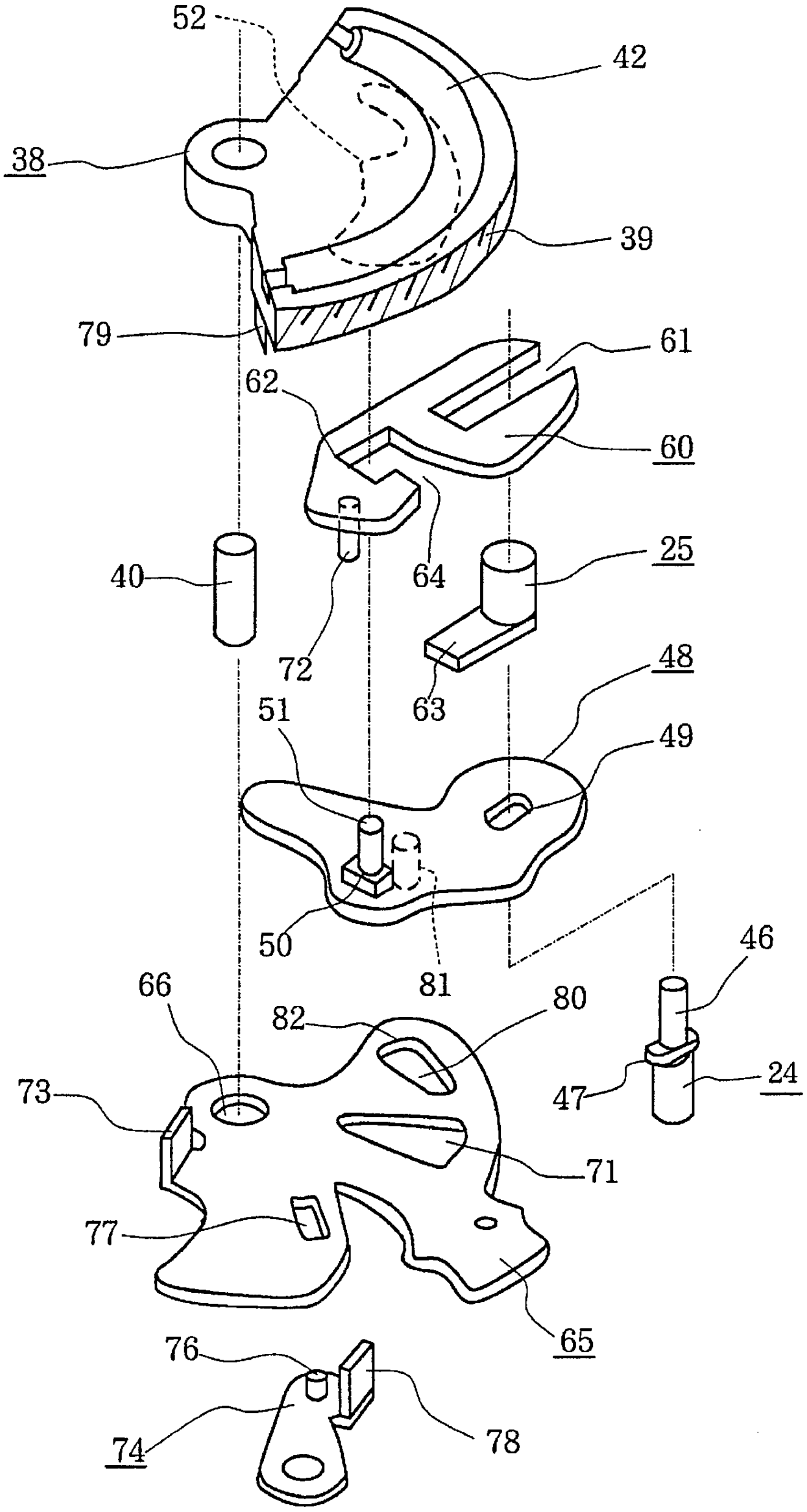
FIG. 9 is a view showing an assembly representing the relationship of the output shaft of the actuator portion of the device shown in FIG. 5.

The sill knob output shaft 25 is formed as a hollow shaft, as shown in FIG. 7, and a small-diameter shaft portion 46 of the key output shaft 24 is rotatably inserted in its hollow portion 45. Reference numeral 47 denotes a large-diameter portion formed on the key output shaft 24. The large-diameter portion 47 is fitted and fixed in a large-diameter hole 49 of a key lever 48 (see also FIG. 9). A rectangular parallelepiped projecting portion 50 and a rod-like projection 51, further projecting from the summit of the projecting portion 50, are formed on the upper surface of the key lever 48. The projection 51 is engaged in a cam groove 52 formed in the lower surface of the output member 38. When the output member 38 is rotated clockwise or counterclockwise from the neutral position, the circumferential wall of the cam groove 52 is brought into contact with the projection 51, thereby rotating the key lever 48 clockwise or counterclockwise.

The relationship between the projection 51 and the cam groove 52 will be described with reference to FIG. 8. The projection 51 indicated by a solid line is at the unlock position, and that indicated by an imaginary line is at the lock position. As described above, the key lever 48 is interlocked with the lock lever 10. Thus, when the lock lever 10 is rotated by the key cylinder 6, the key lever 48 is also rotated about the key output shaft 24 as the center, and the projection 51 shifts between the position of the imaginary line and the position of the solid line. Of the cam groove 52, two opposing edges 53 and 54 form arcs about the shaft 40 as the center. When the output member 38 is at the position of the solid line shown in FIG. 6, the projection 51 at the unlock position is located at a first corner portion 55 defined between the right end of the inner edge 53 and a right cam edge 56. In this state, when the output member 38 is rotated clockwise up to the lock point I, the right cam edge 56 urges the projection 51 to shift it up to the lock position of the imaginary line. When the output member 38 is rotated up to the superlock point II over the lock point I, the projection 51 is engaged with an idling groove 57.

The projection 51 at the lock position is always in contact with the outer edge 54. Even when the rotating output member 38 is at the neutral position, the projection 51 is far from a second corner portion 58 defined between the left end of the outer edge 54 and a left inclined cam edge 59 by a large distance. When the rotating output member 38 is rotated counterclockwise up to the disengaging point III, the projection 51 at the lock position reaches the second corner portion 58. When the rotating output member 38 is further rotated counterclockwise over the disengaging point III, the projection 51 is moved in the unlock direction by the operation of the left inclined cam edge 59.

A sill knob lever 60 is placed on the upper surface of the key lever 48. A forked portion 61 is formed at one end side of the sill knob lever 60, and a hook 62 like a fish hook is formed on the other end side thereof. A key portion 63 projecting in the radial direction is integrally formed on the sill knob output shaft 25 (see FIG. 9), and the key portion 63 is slidably engaged with the forked portion 61 of the sill knob lever 60. The sill knob lever 60 is displaced between the superlock position shown in FIG. 12 and the disengaging position shown in FIG. 11 as it slides with respect to the key portion 63, although how to slide it will be described later. Even when the sill knob lever 60 slides in this manner, the forked portion 61 of the sill knob lever 60 and the key portion 63 of the sill knob output shaft 25 are not disengaged from each other, and thus the sill knob lever 60 and the sill knob output shaft 25 (inner lock button 34) are always integrally interlocked with each other.

Figure 11:
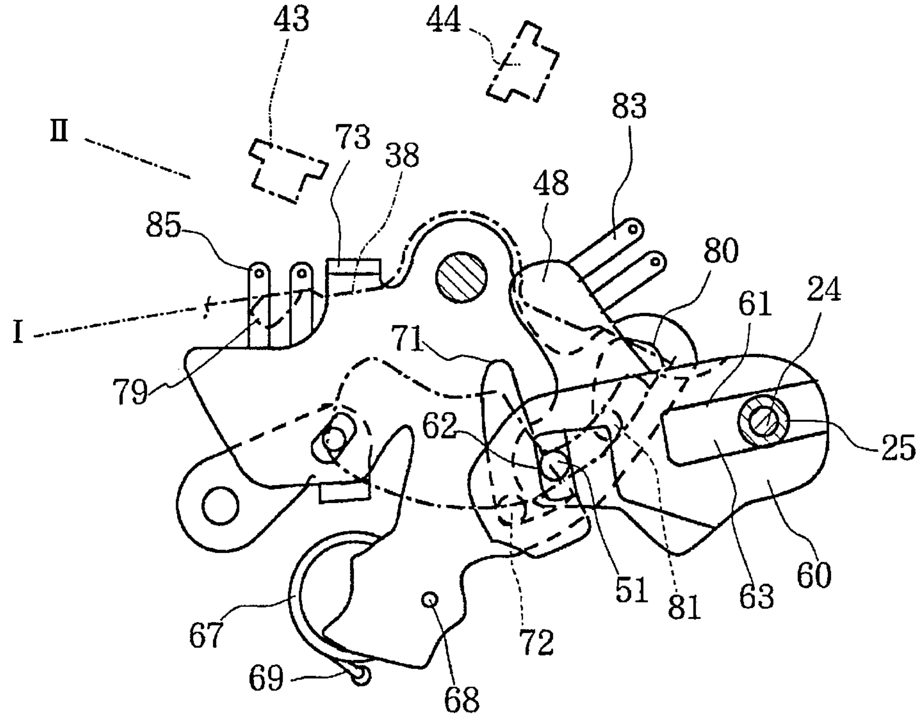
FIG. 11 is a view for explaining an operation for rotating a rotating output member from the state shown in FIG. 10 to the lock position.

When the sill knob lever 60 is at the disengaging position, as shown in FIG. 11, the hook 62 of the sill knob lever 60 is engaged with the projecting portion 50 (see FIG. 9) of the key lever 48, and the sill knob lever 60 and the key lever 48 are coupled to each other so that they are rotated integrally. Thus, when the inner lock button 34 is operated, the sill knob lever 60 is rotated, and the key lever 48 is also rotated through engagement of the hook 62 with the projecting portion 50. As a result, the lock lever 10 can be rotated through the key output shaft 24.

Figure 12:
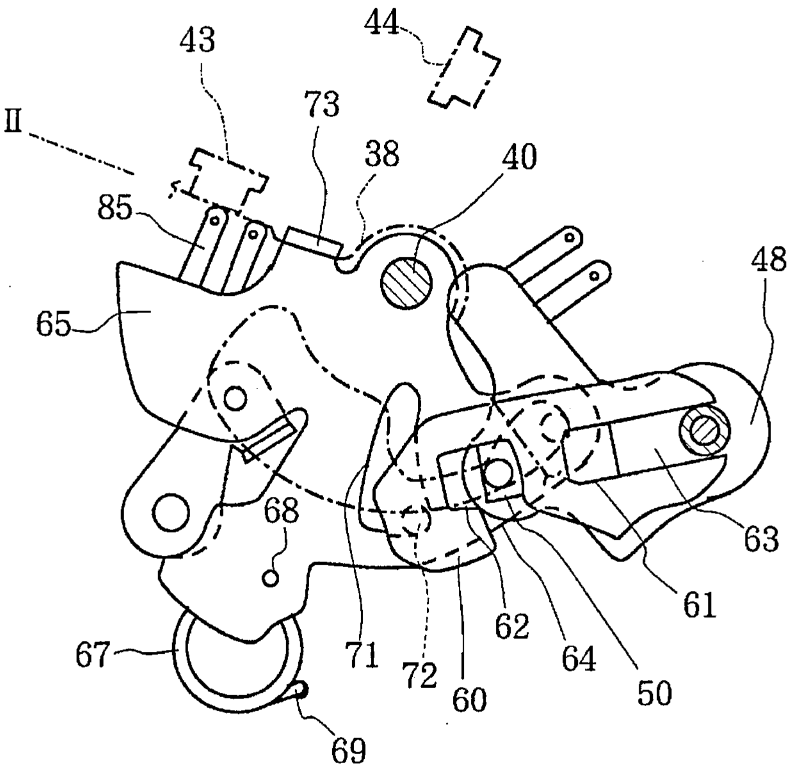
FIG. 12 is a view for explaining an operation for rotating the rotating output member from the state shown in FIG. 11 to the superlock position.

However, when the sill knob lever 60 is moved to the left from the position shown in FIG. 11 and reaches the superlock position shown in FIG. 12, since the projecting portion 50 opposes an opening portion 64 of the hook 62, the unlocking rotation (clockwise rotation) of the sill knob lever 60 is not transmitted to the key lever 48. Thus, even when the sill knob lever 60 is rotated by the inner lock button 34, the lock lever 10 cannot be unlocked. This idling mechanism serves as the superlock mechanism.

A switching body 65 (see FIG. 9) is also provided to the lower side of the key lever 48. The shaft 40 is rotatably inserted in a shaft hole 66 of the switching body 65. One end 68 of an over-center spring 67 is locked by the switching body 65, and the other end 69 thereof is locked by a case 70 of the actuator portion 22. The switching body 65 is held at one position shown in FIG. 10 or the other position shown in FIG. 12 with respect to the dead center of the over-center spring 67 as the boundary.

An almost triangular engaging hole 71 is formed in the switching body 65, and an engaging pin 72 formed on the sill knob lever 60 is engaged with the engaging hole 71. When the switching body 65 is at one position shown in FIG. 10, the sill knob lever 60 is held at the disengaging position due to engagement of the engaging hole 71 with the engaging pin 72. When the switching body 65 is shifted to the other position over the dead center of the over-center spring 67, the sill knob lever 60 slides to the left to reach the superlock position, as shown in FIG. 12.

The switching body 65 is formed with a bent segment 73 which is brought into contact and engaged with the output member 38. When the output member 38 is rotated clockwise over the lock point I, the output member 38 and the bent segment 73 are engaged with each other in FIG. 9, thereby rotating the switching body 65 clockwise about the shaft 40 as the center. Hence, when the switching body 65 is moved over the dead center of the over-center spring 67, it is shifted to the other position, as shown in FIG. 12, and pulls the engaging pin 72 with the engaging hole 71. As a result, the sill knob lever 60 is switched to the superlock position.

Reference numeral 74 denotes a disengaging lever which is rotatably, axially supported on the case 70 through a shaft 75. A projection 76 is formed on the pivotal end side of the disengaging lever 74. The projection 76 is engaged with an elongated hole 77 formed in the switching body 65. An engaging segment 78 is formed on the disengaging lever 74 to project high on the upper side thereof. A drop-like projecting portion 79 is formed on the lower side of the output member 38.

Figure 13:
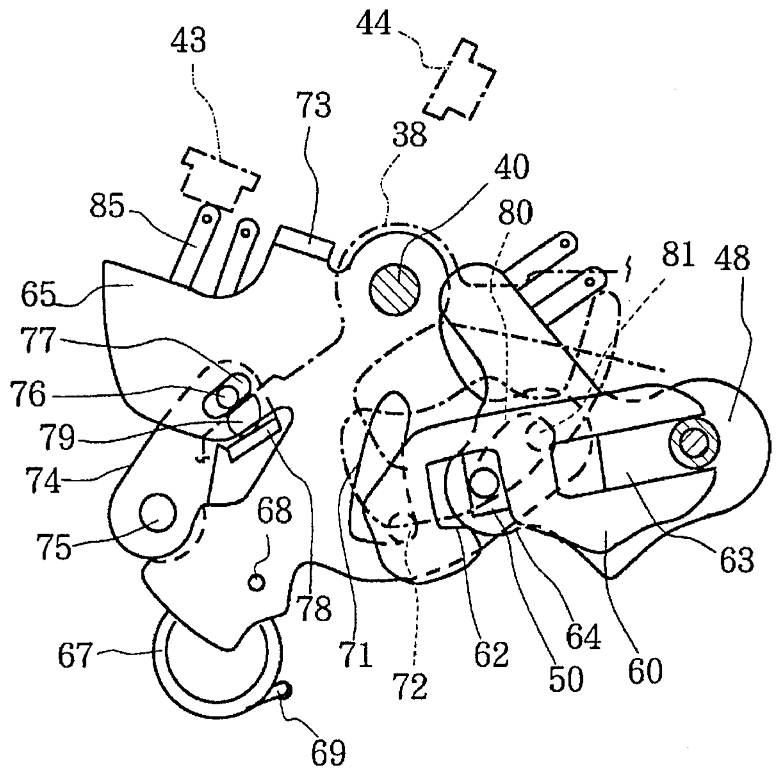
FIG. 13 is a view for explaining an operation in the superlocked state of the device shown in FIG. 5.
Figure 14:
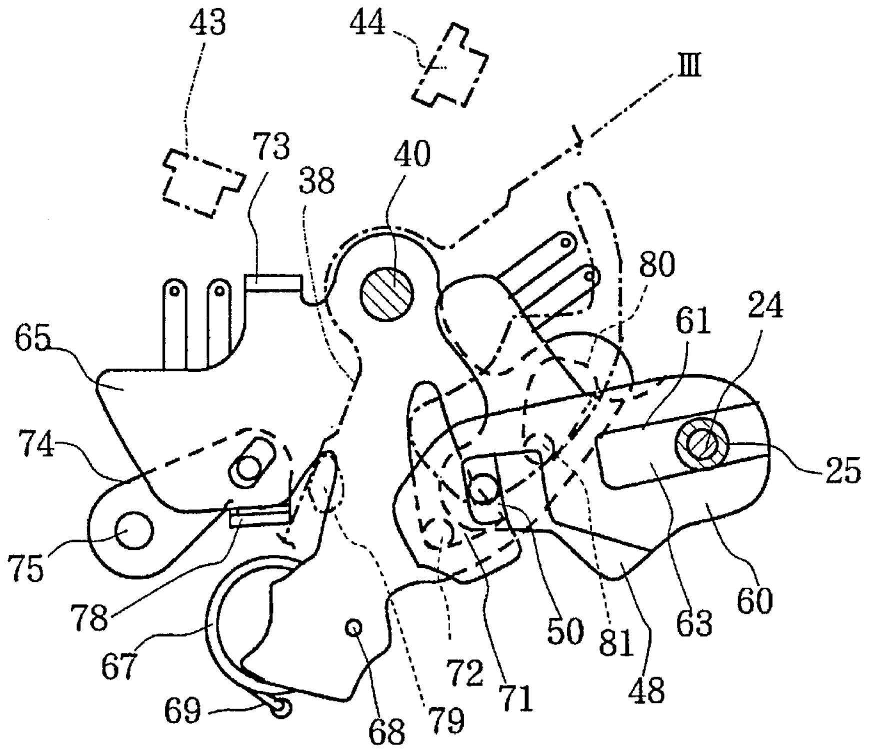
FIG. 14 is a view for explaining an operation for rotating the rotating output member from the state shown in FIG. 13 to the disengaging position.

In FIG. 13, the switching body 65 is held at the other position by the over-center spring 67, and the output member 38 is held at the neutral position by the spring 41. In this state, the projecting portion 79 of the output member 38 and the engaging segment 78 of the disengaging lever 74 oppose each other. In this state, when the rotating output member 38 is rotated counterclockwise, the projecting portion 79 is engaged with the engaging segment 78 to rotate the disengaging lever 74 clockwise, thereby rotating the switching body 65 counterclockwise. As shown in FIG. 14, when the rotating output member 38 is rotated to reach the disengaging point III, the projecting portion 79 and the engaging segment 78 are disengaged from each other. When the projecting portion 79 and the engaging segment 78 are disengaged, the switching body 65 is shifted over the dead center of the over-center spring 67 and is held at one position.

Reference numeral 80 denotes another almost triangular engaging hole formed in the switching body 65. An engaging pin 81 formed on the key lever 48 is engaged in the engaging hole 80. An inner edge 82 of the engaging hole 80 is formed to be substantially parallel to the line connecting the shaft 40 and the key output shaft 24. While the switching body 65 is at the other position, as shown in FIG. 13, when the key lever 48 is rotated from the lock position to the unlock position, the engaging pin 81 is engaged with the inner edge 82 to rotate the switching body 65 counterclockwise over the dead center of the over-center spring 67, thereby shifting the switching body 65 to one position side.

Reference numeral 83 denotes a brush body attached to the key lever 48. The brush body 83 is selectively connected to a plurality of stationary terminals 84 provided to the case 70 in accordance with the position of the key lever 48, thereby detecting whether the key lever 48 is at the lock position or the unlock position. Reference numeral 85 denotes a brush body attached to the switching body 65. The brush body 85 is connected to a stationary terminal 86 provided to the case 70 in accordance with the position of the switching body 65, thereby detecting whether the switching body 65 is at the superlock position or the disengaging position.

Figure 1:
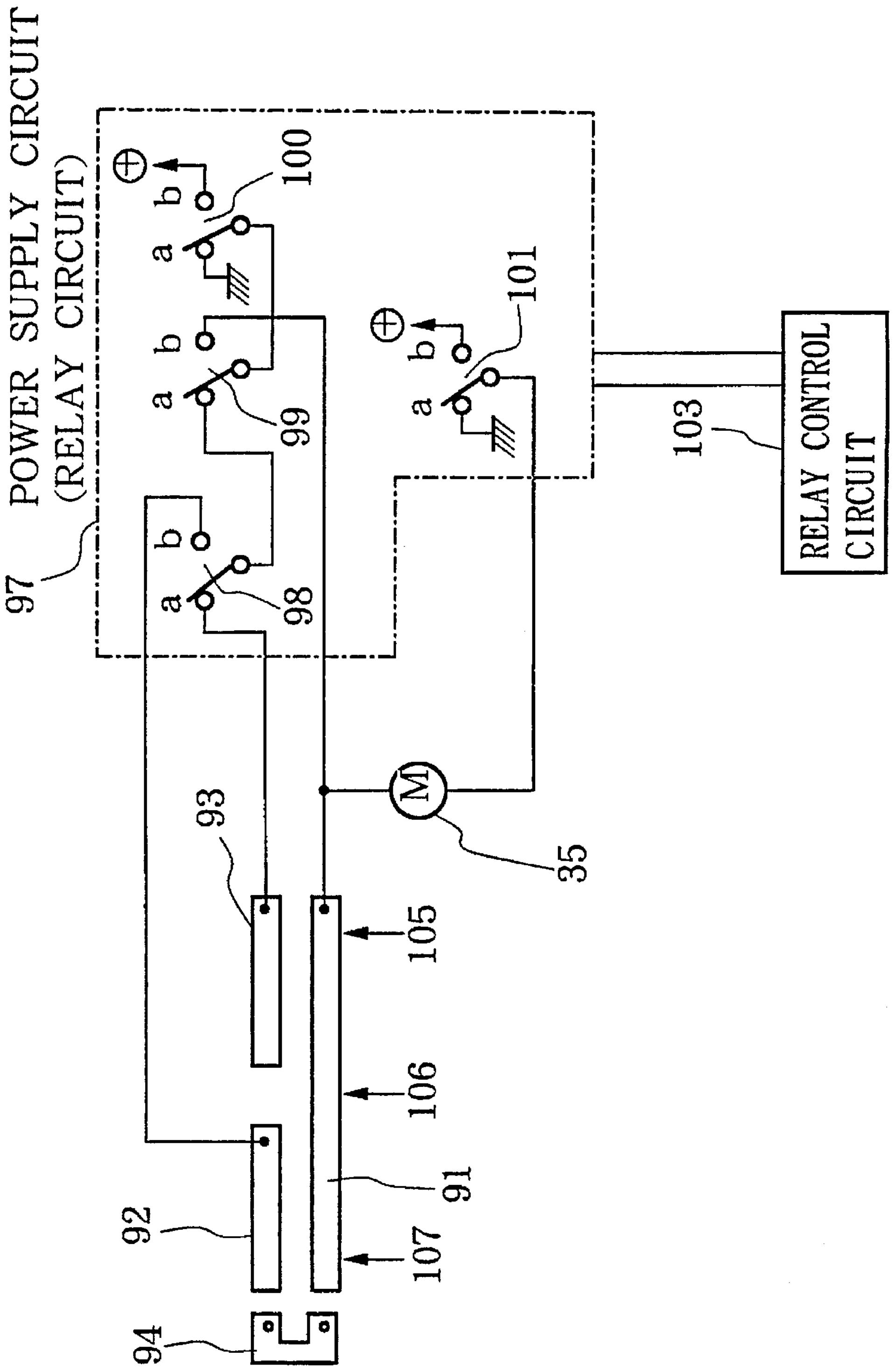
FIG. 1 is a circuit diagram of a control circuit according to an embodiment of the present invention.
Figure 2:
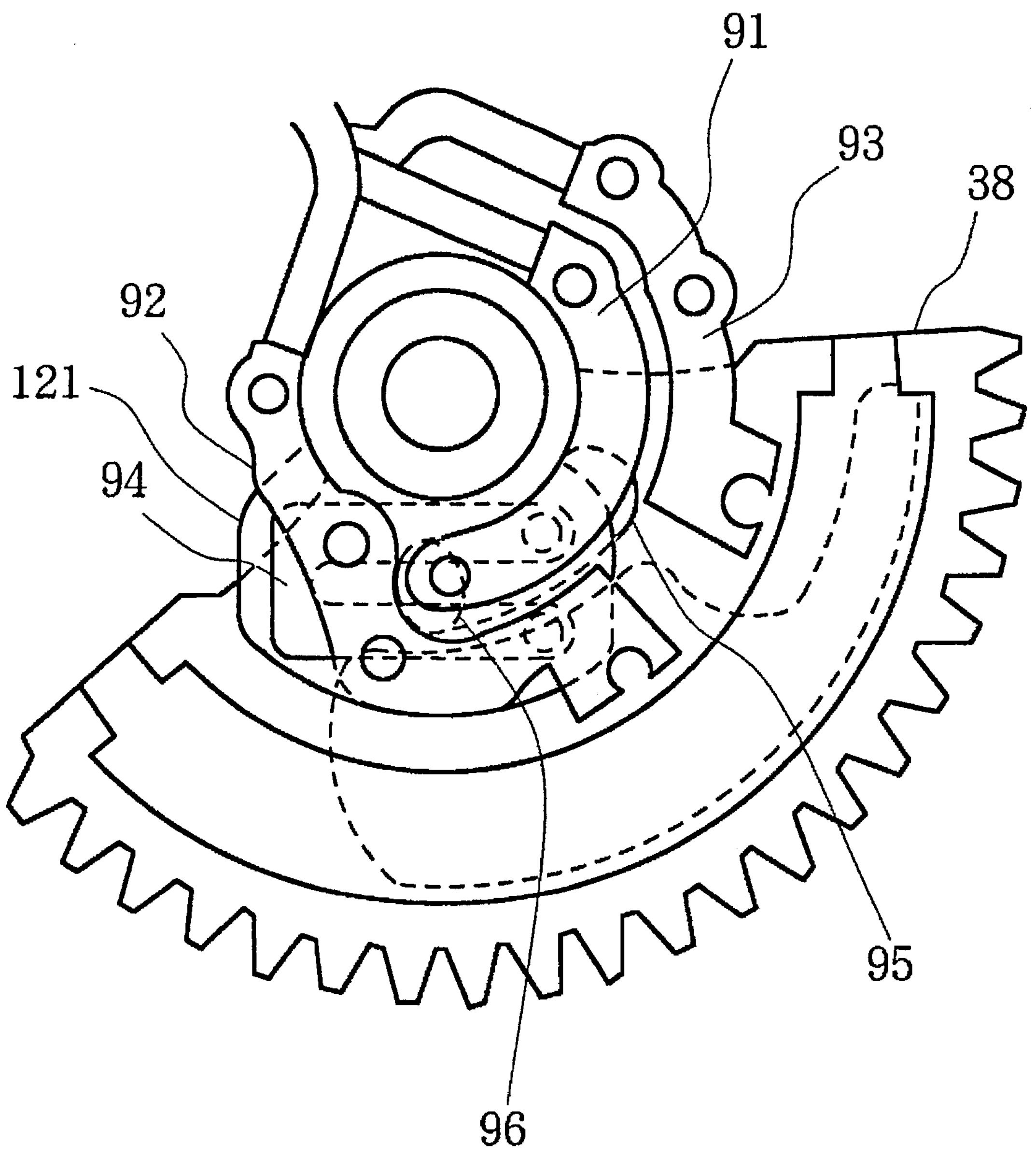
FIG. 2 is a diagram showing the practical arrangement of terminals and a brush in the circuit shown in FIG. 1.

FIG. 1 is a circuit diagram showing the control circuit of this apparatus. As shown in FIG. 1, this control circuit has a relay control circuit 103, a relay circuit 97, a brush 94, and first, second, and third terminals 91, 93, and 92. The relay control circuit 103 and the relay circuit 97 perform a shift between the unlocked, locked, and superlocked states by controlling power supply to the motor 35 based on a given instruction. The brush 94 is fixed to a state detecting member 121, as shown in FIG. 2, whose position changes in accordance with the states. The first to third terminals 91 to 93 are provided in opposition to the brush 94. To perform a shift from the unlocked state to the locked state, the first and second terminals 91 and 93 are brought into sliding contact with the brush 94. To perform a shift from the superlocked state to the locked state, the first and third terminals 91 and 92 are brought into sliding contact with the brush 94. To perform the shift from the unlocked state to the locked state, the relay circuit 97 supplies power to the motor 35 through the first and second terminals 91 and 93 and the brush 94. To perform the shift from the superlocked state to the locked state, the relay circuit 97 supplies power to the motor 35 through the first and third terminals 91 and 92 and the brush 94. To perform other state shifts, the relay circuit 97 directly supplies power to the motor 35 and not through the first to third terminals 91 to 93 or the brush 94. To finish a shift from the unlocked or superlocked state to the locked state, the brush 94 and the terminals 93 and 92 are disconnected from each other, thereby stopping power supply to the motor The relay circuit 97 has switching relays 98 to 101 which are controlled by the relay control circuit 103. A contact a of the switching relay 100 is connected to a negative power supply, a contact b thereof is connected to a positive power supply, and the movable contact thereof is connected to the movable contact of the switching relay 99. A contact a of the switching relay 99 is connected to the movable contact of the switching relay 98, and a contact b thereof is connected to the terminal 91. A contact a of the switching relay 98 is connected to the terminal 93, and a contact b thereof is connected to the terminal 92. A contact a of the switching relay 101 is connected to the negative power supply, a contact b thereof is connected to the positive power supply, and the movable contact thereof is connected to one end of the motor 35. The other end of the motor 35 is connected to the terminal 91. The switching relay 99 determines whether power supply to the motor 35 is performed through the terminals 91 to 93 and the brush 94. The relays 100 and 101 turn on/off power supply and switch the power supply direction. The relay 98 determines whether power supply to the motor 35 is performed through the terminal 93, or through the terminal 92.

FIG. 2 shows the practical arrangement of the terminals 91 to 93 and the brush 94. As shown in FIG. 2, the terminals 91 to 93 are concentrically provided in the rotating direction of the output member 38, and are fixed so that they do not rotate. The brush 94 is provided to be rotatable about the rotation axis of the output member 38 as the center, such that it is pivotal while being brought into contact with the terminals 91 to 93. State detecting member 121 fixed to brush 94 has a projecting portion 96 projecting into a groove 95 formed in the output member 38. The groove 95 has an arcuated shape having the rotation axis of the output member 38 as the center. The projecting portion 96 is pivoted along with the pivot movement of the output member 38 as it is brought into contact with the two end portions of the arc of the groove 95. The arcuated shape of the groove 95 has such a size that the output member 38 moves the brush 94 among the unlock, lock, and superlock positions and that even when the output member 38 is returned to the neutral position thereafter, the position of the brush 94 will not be changed.

Figure 10:
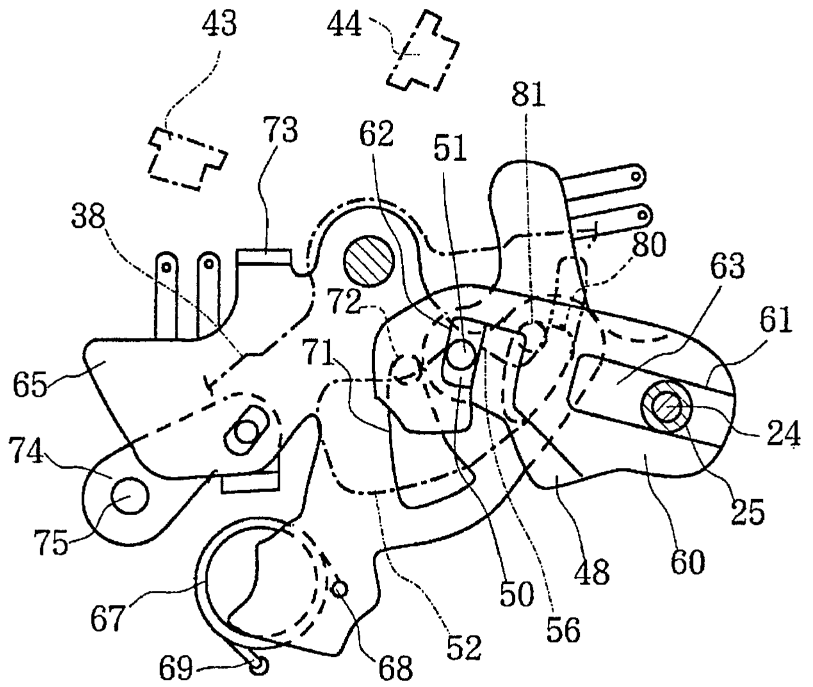
FIG. 10 is a diagram for explaining the operation of the unlocked state of the device shown in FIG. 5.

The operation of the apparatus will be described. In the unlocked state, as shown in FIG. 10, both the key lever 48 and the sill knob lever 60 are at the unlock position, and the rotating output member 38 is set at the neutral position due to the operation of the spring 41. The brush 94 is located at an unlock position 105 in FIG. 1. In FIG. 2, the projecting portion 96 is located at the right end of the groove 95. All the movable contacts of the relays 98 to 101 are connected to their contacts a. In this state, when a signal instructing that the door is to be locked is received, the relay control circuit 103 connects the movable contact of the switching relay 100 to the contact b. Thus, the motor 35 receives power through the terminal 93, the brush 94, and the terminal 91, thereby rotating the output member 38 clockwise. The output member 38 rotates the brush 94 clockwise through the state detecting member 121 projecting portion 96 with the right end of its groove 95.

When the rotating output member 38 is rotated up to the lock point I shown in FIG. 11, the right cam edge 56 (see also FIG. 8) of the cam groove 52 formed in the lower side of the rotating output member 38 urges the projection 51 of the key lever 48 to rotate it counterclockwise. Thus, the key lever 48 is shifted to the lock position. Rotation of the key lever 48 is transmitted to the key output shaft 24 on one hand through engagement of the large-diameter hole 49 with the large-diameter portion 47, and to the sill knob lever 80 on the other hand through engagement of the projecting portion 50 with the hook 62. Then, the lock lever 10 and the inner lock button 34 are switched to the lock position through the key output shaft 24 and the sill knob lever 60, respectively.

When the output member 38 is rotated up to the lock point I, the brush 94 is located at a lock position 106, so that the brush 94 and the terminal 93 are disconnected from each other. Thus, power supply to the motor 35 is also stopped. After power supply to the motor 35 is stopped, the relay control circuit 103 switches the movable contact of the switching relay 100 to its contact a. This switching operation is performed when the timer count indicates that a predetermined period of time which is necessary and sufficient for performing a shift to the locked state has elapsed after the switching relay 100 is switched to the contact b in the unlocked state. Meanwhile, as power supply to the motor 35 is stopped, the rotating output member 38 is returned to the neutral position due to the elastic force of the spring 41. At this time, the projecting portion 96 of the brush 94 is merely moved to the left within the groove 95 relative to the groove 95. Thus, the brush 94 is maintained at the lock position 106. This completes the shift to the locked state.

In the unlocked state, when a signal instructing a shift to the superlocked state is received, the relay control circuit 103 switches the movable contacts of the relays 99 and 100 to the contact b side. Thus, the motor 35 receives power not through the terminals 91 to 93 and the brush 94, and the motor 35 rotates the rotating output member 38 clockwise from the neutral position to the superlock point II shown in FIG. 12. Thus, the brush 94 is moved to a superlock position 107 shown in FIG. 1. At this time, when the rotating output member 38 moves over the lock point I, the side surface of the rotating output member 38 is brought into contact with the bent segment 73 of the switching body 65, thereby moving the switching body 65 to the other position over the dead center of the over-center spring 67. Since the engaging pin 72 of the sill knob lever 60 is engaged with the triangular engaging hole 71 in the switching body 65, the sill knob lever 60 is moved to the left by the shift of the switching body 65, as shown in FIG. 12, from the position shown in FIG. 11, to reach the superlock position, and the hook 62 of the sill knob lever 60 and the projecting portion 50 of the key lever 48 are disengaged from each other. In this state, even when the sill knob lever 60 is rotated clockwise by unlocking the inner lock button 34. the hook 62 is not engaged with the projecting portion 50 but idles. Thus, the key lever 48 is not rotated, and thus the lock lever 10 cannot be unlocked. Power supply to the motor 35 is stopped when the brush body 85 detects that the switching body 65 is shifted over the dead center of the over-center spring 67 and the relay control circuit 103 switches the movable contacts of the relays 99 and 100 to the contact a side. Then, the rotating output member 58 is returned to the neutral position by the elastic force of the spring 41, and is set in the state shown in FIG. 10. Note that the brush 94 is maintained at the superlock position 107. Power supply to the motor 35 may also be stopped by switching the relays 99 and 100 to the contact a side based on a timer count indicating that a predetermined period of time has elapsed after the relays 99 and 100 are switched to the contact b side in the unlocked state.

In the locked state, when a signal instructing a shift to the superlocked state is received, the relay control circuit 103 immediately switches the movable contacts of the relays 99 and 100 to the contact b side, and rotates the rotating output member 38 clockwise up to the superlock point II, thereby performing superlocking.

In the superlocked state, when a signal instructing a shift to the locked state is received, the relay control circuit 103 switches the movable contacts of the relays 98 and 101 to the contact b side, thereby rotating the motor 35 in the reverse direction. At this time, since the brush 94 is located at the superlock position 107, power is supply to the motor 35 through the terminals 91 and 92 and the brush 94. Therefore, the rotating output member 38 is rotated counterclockwise, so that the projecting portion 79 of the rotating output member 38 opposing the engaging segment 78 of the disengaging lever 74 urges the engaging segment 78. Thus, the disengaging lever 74 is rotated clockwise, and the switching body 65 is rotated counterclockwise through engagement of the projection 76 with the elongated hole 77. When the rotating output member 38 is rotated counterclockwise to reach the disengaging point III shown in FIG. 14 in this manner, although the projecting portion 79 and the engaging segment 78 are disengaged from each other at this time point, the switching body 65 is shifted to one position over the dead center of the over-center spring 87. Hence, the hook 62 of the sill knob lever 60 and the projecting portion 50 of the key lever 48 are engaged again, thereby disengaging the superlocked state. Even when the rotating output member 38 is rotated up to the disengaging point III shown in FIG. 14, the left inclined cam edge 59 of the cam groove 52 does not urge the projection 51 of the key lever 48. Thus, at this stage, the key lever 48 is maintained at the lock position and is not shifted. When the rotating output member 38 is rotated counterclockwise up to the disengaging point III, thus moving the brush 94 to the lock position 106, the brush 94 and the terminal 92 are disconnected from each other, and power supply to the motor 35 is stopped. When power supply to the motor 35 is stopped, the relay control circuit 103 switches the movable contacts of the relays 98 and 101 to the contact a side. This switching operation is performed when a timer count indicates that a predetermined period of time has elapsed since the movable contacts of the relays 98 and 101 are switched to the contact b side. When power supply to the motor 35 is stopped, the rotating output member 38 is returned to the neutral position by the elastic force of the spring 41. Note that the brush 94 is held at the lock position 106. In this state, only the superlocked state is released, and the key lever 48 (lock lever 10) is maintained at the lock position without a change.

Figure 15:
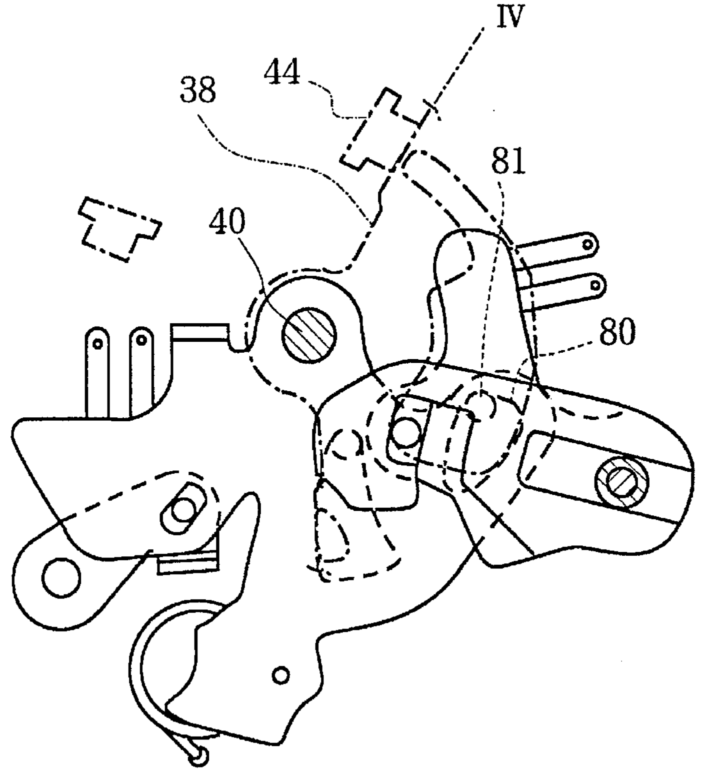
FIG. 15 is a view for explaining an operation for rotating the rotating output member from the state shown in FIG. 14 to the unlock position.

In the superlocked state, when a signal instructing a shift to the unlocked state is received, the relay control circuit 103 switches the movable contacts of the relays 99 and 101 to the contact b side in the same manner as described above, thereby rotating the motor 35 in the reverse direction. In this case, after the rotating output member 38 is moved to the disengaging point III, it is further moved to the unlock point IV. At this time, the left inclined cam edge 59 of the cam groove 52 urges the projection 51 of the key lever 48 to rotate the key lever 48 clockwise, so that the key lever 48 and the sill knob lever 80 are switched to the unlock position (FIG. 15). The brush 94 is moved to the unlock position 105. When the key lever 48 is shifted to the unlock position, the unlocked state is detected through the brush body 83 and the stationary terminals 84. A signal indicating this state is received by the relay control circuit 103, and the relay control circuit 103 switches the movable contacts of the relays 99 and 101 to the contact a side. As a result, power supply to the motor 35 is stopped. Power supply to the motor 35 may also be stopped by switching the relays 99 and 101 to the contact a side based on a timer count indicating that a predetermined period of time has elapsed after the relays 99 and 101 are switched to the contact b side in the superlocked state.

In the locked state, when a signal instructing a shift to the unlocked state is received, the relay control circuit 103 immediately switches the movable contacts of the relays 99 and 101 to the contact b side, so that the rotating output member 38 is moved to the unlock point IV, thereby performing a shift to the unlocked state.

Superlocking can be released also by the key cylinder 6. More specifically, while the key lever 48 is in the state shown in FIG. 13, when the key cylinder 6 is unlocked and the key output shaft 24 is rotated for unlocking through the lock lever 10, the key lever 48 is rotated clockwise, and the engaging pin 81 is engaged with the inner edge 82 to rotate the switching body 65 counterclockwise, thereby returning the switching body 65 to the one position side. Thus, the sill knob lever 60 is moved to the right to reach the disengaging position, thereby releasing. superlocking.

Figure 3:
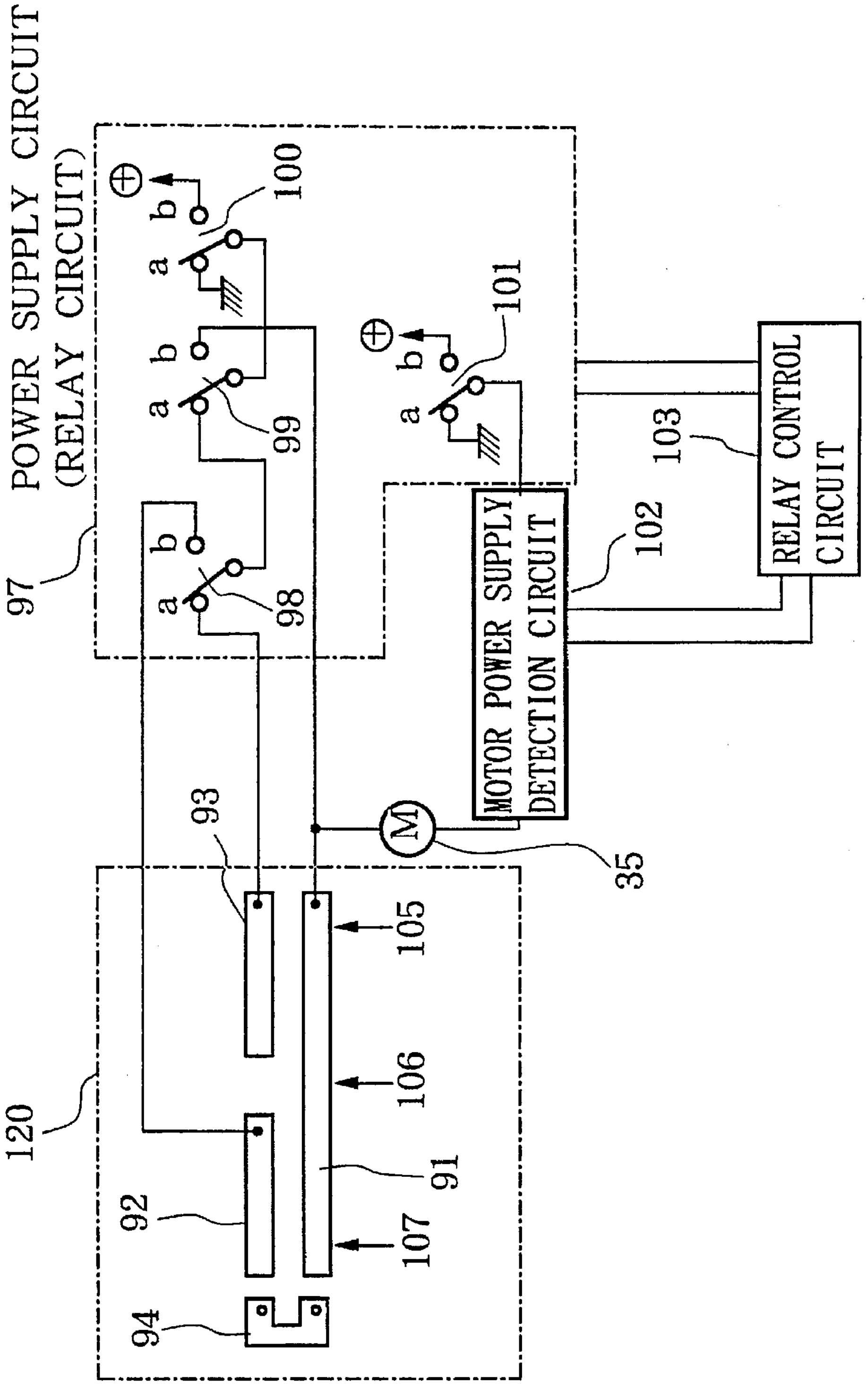
FIG. 3 is a circuit diagram of a control circuit according to another embodiment of the present invention.

FIG. 3 is a circuit diagram showing another arrangement of the control circuit. This control circuit is identical to that shown in FIG. 1 in that it has a brush 94, terminals 91 to 93, and a power supply stopping means 120. The brush 94 and the terminals 91 to 93 are moved relative to each other by a motor 35 while they are in slidable contact with each other. The power supply stopping means 120 stops power supply to the motor 35 when the brush 94 and the terminal 93 or 92, at the moving position as they are shifted from the unlocked or superlocked state to the locked state, are disconnected from each other. However, this control circuit also has a detection circuit 102 for detecting that power supply to the motor 35 is stopped based on a current flowing through the motor 35, and outputs a stop detection signal indicating this to a relay control circuit 103. The movable contact of a relay 101 is connected to the motor 35 through the detection circuit 102. A relay 99 determines whether power supply to the motor 35 is performed through the power supply stopping means 120.

Figure 4:
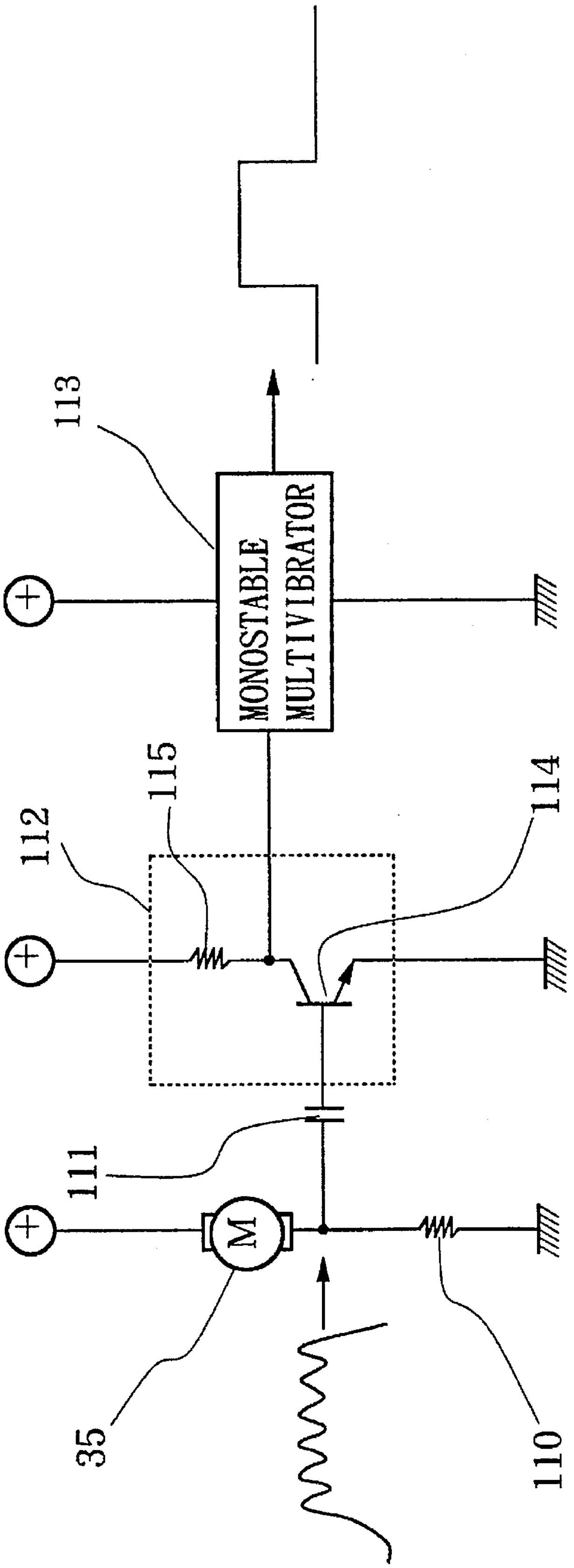
FIG. 4 is a circuit diagram of the detection circuit of the circuit shown in FIG. 3.

FIG. 4 is a circuit diagram of the detection circuit 102. As shown in FIG. 4, the detection circuit 102 has a resistor 110, a waveshaping circuit 112, and a monostable multivibrator 113. The resistor 110 detects a current flowing through the motor 35. The waveshaping circuit 112 is connected to the motor 35 side of the resistor 110 through a capacitor 111. The monostable multivibrator 113 is connected to the output of the waveshaping circuit 112. The waveshaping circuit 112 has a transistor 114 whose base is connected to the capacitor 111. The emitter path of the transistor 114 is connected to a negative power supply, and a collector path thereof is connected to a positive power supply through a resistor 115. When power supply to the motor 35 is stopped, the transistor 114 outputs a trigger signal to the monostable multivibrator 113. The monostable multivibrator 113 outputs a motor stop detection signal St based on this trigger signal. In place of one which outputs a motor stop detection signal St when a current flowing through the motor 35 becomes a predetermined value or less, in this manner, one which outputs a motor stop detection signal St when a predetermined number of times of pulsation of the current accompanying rotation of the motor 35 are not detected within a predetermined period of time, can also be employed as a detection circuit 102.

The difference between the operation of the control circuit shown in FIG. 3 and that of the control circuit shown in FIG. 1 will be described. To perform a shift from the unlocked state to the locked state, when the rotating output member 38 is rotated up to the lock point I, the brush 94 is located to the lock position 106, and is thus disconnected from the terminal 93. Thus, power supply to the motor 35 is also disconnected. When power supply to the motor 35 is disconnected, the detection circuit 102 outputs a motor stop detection signal St. Upon reception of this signal St, the relay control circuit 103 switches the movable contact of the relay 100 to the contact a. Since power supply to the motor 35 is stopped, a shift to the locked state is completed in the same manner as in FIG. 1.

To perform a shift from the superlocked state to the locked state, when the brush 94 is moved to the lock position 106 by rotating the rotating output member 38 counterclockwise up to the disengaging point III, the brush 94 and the terminal 92 are disconnected from each other, and power supply to the motor 35 is stopped. When power supply to the motor 35 is stopped, the detection circuit 102 outputs a motor stop detection signal. Upon reception of this signal, the relay control circuit 103 switches the movable contacts of the relays 98 and 101 to the contact a side. Since power supply to the motor 35 is stopped, the shift to the locked state is completed in the same manner as in FIG. 1. The operations for other state shifts are the same as in FIG. 1.

What is claimed is:

1. A control apparatus for a door lock unit that shifts between unlocked, locked, and superlocked states in accordance with the amount and direction of a motor driven, comprising:

control means for performing a shift between the states by controlling power supply to said motor based on given instructions, said control means comprising a state detecting member, the position of which shifts in accordance with said states, a brush fixed to said state detecting member, first, second and third terminals provided in opposition to the brush, said first and second terminals being brought into sliding contact with said brush when performing a shift from the unlocked state to the locked state, and said first and third terminals being brought into sliding contact with said brush when performing a shift from the superlocked state to the locked state, and a power supply circuit for supplying power to said motor through said first and second terminals and said brush when performing the shift from the unlocked state to the locked state, and through said first and third terminals and said brush when performing the shift from the superlocked state to the locked state, and for directly supplying power to said motor, not through said first to third terminals and said brush, when performing other state shifts, wherein power supply to said motor is stopped when finishing a shift from the unlock or superlocked state to the locked state, by a disconnection of said brush from said terminals.

2. An apparatus according to claim 1, wherein said power supply circuit comprises first and second paths that are interposed in a path for supplying power to said motor and are parallel to each other, said brush and said first to third terminals are interposed in said first path, and said power supply circuit comprises switching means for selectively connecting one of (1) a first power supply condition wherein power supply to said motor is performed through said first path, (2) a second power supply condition wherein power supply to said motor is performed through said second path, and (3) a third power supply condition wherein power supply to said motor is not performed.

3. An apparatus according to claim 1, wherein said door lock device has an output member swung by said motor from a neutral position in two directions, said output member being swung by said motor toward a first swing position for causing a shift to the locked state, toward a second swing position, having a swing angle larger than that of the first swing position, for causing a shift to the superlocked state, and then toward third and fourth swing positions, positioned almost symmetrically with respect to the first and second swing positions about said neutral position, for releasing the superlocked and locked states, respectively, said output member being returned to the neutral position after a shift to each state, and said output member having a groove extending along a swing direction thereof and having a length almost corresponding to a length between the neutral position and the second swing position, and said state detecting member having an engaging member engageable with the groove and swingable in the same direction as said output member, so that said state detecting member is moved by said output member when said output member is moved to any one of the first to fourth swing positions, and takes a position in accordance with a corresponding one of the unlocked, locked, and superlocked states.

4. An apparatus according to claim 1, wherein said control means has means for detecting, when said door lock device shifts to a one state of any one of the superlocked state and the unlocked state, that said door lock device has reached said one state, and outputting a signal indicating this, thereby stopping power supply to said motor based on the detection signal.

5. A control apparatus of a door lock device that shifts between unlocked, locked, and superlocked states in accordance with the amount and direction of a motor driven, comprising:

control means for performing a shift between the unlocked, locked, and superlocked states by controlling power supply to said motor based on a given instruction;

a power supply stopping means, having a brush and a terminal which are moved relative to each other by said motor while being in slidable contact with each other, for stopping power supply to said motor, at a moving position after being shifted from any one of the unlocked state and the superlocked state to the locked state, by disconnecting said brush from said terminal; and detection means for detecting that power supply to said motor is stopped based on a current flowing through said motor, and outputting a stop detection signal indicating this to said control means.

6. An apparatus according to claim 5, further comprising first and second paths that are interposed in a path for supplying power to said motor and are parallel to each other, and wherein said power supply stopping means is interposed in said first path, and said control means comprises switching means for selectively connecting one of (1) a first power supply condition wherein power supply to said motor is performed through said first path, (2) a second power supply condition wherein power supply to said motor is performed through said second path, and (3) a third power supply condition wherein power supply to said motor is not performed.

7. An apparatus according to claim 5, wherein said terminal includes first to third terminals, said brush is brought into slidable contact with said first and second terminals when performing the shift from the unlocked state to the locked state, and with said first and third terminals when performing the shift from the superlocked state to the locked state, and said control means comprises switching means for selecting one of said second and third terminals through which power supply to said motor is performed.

8. An apparatus according to claim 6, wherein said control means supplies power to said motor, in any one of the unlocked state and the superlocked state, through said first path upon reception of a signal instructing a shift to the locked state, and performs a control operation thereafter, upon reception of a signal instructing a shift to another state, when said detection means outputs a stop detection signal.

9. An apparatus according to claim 5, wherein said detection means outputs the stop detection signal when a predetermined number of times of pulsation of a current accompanying rotation of said motor are not detected within a predetermined period of time.

10. An apparatus according to claim 5, wherein said detection means outputs the stop detection signal when a current flowing through said motor becomes not more than a predetermined value.

* * * * *